(12) United States Patent
Hsu et al.

(10) Patent No.: US 6,549,220 B1
(45) Date of Patent: Apr. 15, 2003

(54) METHOD, SYSTEM, AND PROGRAM FOR PROVIDING PAGES OF INFORMATION WITH NAVIGATION AND CONTENT AREAS

(75) Inventors: Jimmy Ming-Der Hsu, Austin, TX (US); Peter Y. Hsu, Austin, TX (US); William W. Lawton, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/329,460

(22) Filed: Jun. 10, 1999

(51) Int. Cl.[7] ............................................. G06F 15/00
(52) U.S. Cl. ......................................... 345/854; 345/817
(58) Field of Search ........................ 345/853–855, 345/817, 802, 828, 835–839, 840–845, 751–753, 754–759, 763–764, 788, 792, 793, 798–801; 701/200, 213, 211, 208

(56) References Cited

U.S. PATENT DOCUMENTS

| | | | |
|---|---|---|---|
| 4,821,211 A | 4/1989 | Torres | |
| 5,572,643 A | 11/1996 | Judson | |
| 5,675,753 A | 10/1997 | Hansen et al. | |
| 5,687,331 A | 11/1997 | Volk et al. | |
| 5,689,669 A | 11/1997 | Lynch et al. | |
| 5,724,595 A | 3/1998 | Gentner | |
| 5,806,077 A | 9/1998 | Wecker | |
| 5,826,085 A | 10/1998 | Bennett et al. | |
| 5,848,246 A | 12/1998 | Gish | |
| 5,864,862 A | 1/1999 | Kriens et al. | |
| 6,012,055 A * | 1/2000 | Campbell et al. | 707/5 |
| 6,067,502 A * | 5/2000 | Hayashide et al. | 701/209 |
| 6,075,528 A * | 6/2000 | Curtis | 345/744 |
| 6,091,417 A * | 6/2000 | Lefkowitz | 345/760 |
| 6,223,122 B1 * | 4/2001 | Hancock et al. | 701/200 |
| 6,317,781 B1 * | 11/2001 | De Boor et al. | 709/217 |
| 6,356,834 B2 * | 3/2002 | Hancock et al. | 701/200 |
| 6,437,807 B1 * | 8/2002 | Berquist et al. | 345/764 |

OTHER PUBLICATIONS

US 5,884,318, 3/1999, Nielson et al. (withdrawn)

* cited by examiner

*Primary Examiner*—Steven Sax
(74) *Attorney, Agent, or Firm*—David W. Victor; Konrad Raynes Victor & Mann LLP

(57) ABSTRACT

Disclosed is a system, method, program, and electronic storage media for providing at least one content area of information and n different sized navigation areas. There are n addressable locations for each content area. Each of the n addressable locations for one content area comprises the same content area with a different sized navigation area. Further, each of the n navigation areas includes at least one link to another addressable location with the same content area and a different sized navigation area.

36 Claims, 7 Drawing Sheets

METHOD, SYSTEM, AND PROGRAM FOR PROVIDING PAGES OF INFORMATION WITH NAVIGATION AND CONTENT AREAS

BACKGROUND OF THE INVENTION

1. Field of the Invention

The present invention relates to a method, system, program, and electronic storage media for implementing interlinking pages of information, especially Hypertext Mark-Up Language (HTML) pages.

2. Description of the Related Art

One of the rapidly expanding sources of information and documentation is the "World Wide Web" (WWW) or Internet. Servers which provide access to information over the Internet typically utilize the Hypertext Transfer Protocol (HTTP). Oftentimes, textual information is implemented in a standard page description language such as the Hypertext Markup Language (HTML). HTML provides basic document formatting and allows the developer to specify "links" to other servers and files. Use of an HTML-compliant client browser involves specification of a link via a Uniform Resource Locator or "URL". Users may access an HTML document from over the Internet and then use an HTML browser to display the downloaded file. The advantage of such HTML browsers is that they can execute on many different computing environments and numerous types of operating systems. Thus, an information provider need only code a document in HTML to make that document available to just about every computing platform that provides Internet access.

HTML documents may include hypertext links, which are implemented as a display icon or a highlighted textual indicator. The HTML link represents a URL address of a another related HTML page of information. When a user selects a hypertext link with an input device, such as a mouse, the HTML browser generates a URL request for the document, such as the HTML page, that is addressed by the URL address. The URL can address a document at the same web site from which the current document came or from another different web site. Additionally, hypertext links can address locations within the current document to allow the user to "jump" to various places within the document without having to manually search the document for the referenced location.

A document may be presented across multiple HTML pages. Each page would typically include HTML links. In this way, web site designers can disperse related information across HTML web pages to allow users to navigate through different sections of a document using the HTML links. For instance, the web site designer may encode a page or discrete section of a book or manual on different HTML pages or separate newspaper articles from a newspaper on separate HTML pages. Typically, an HTML page includes a navigation area that provides HTML links to different parts of the same document or the next, previous, or related pages.

The navigation of HTML documents can occur in a number of different contexts. One involves navigating within the same document. Frequently, there will be one, large hypertext document containing a great deal of content. Often this content is broken down into sections, chapters or other types of divisions, each of which contains links to pages including other sections of the document. At the beginning of the document, or at some other convenient location, there may be a navigation area in the form of an index or table of contents of hypertext links to the different sections, which may be maintained on the same page, different pages, and different pages at the same or different web site.

Regardless of the context in which web page navigation occurs, the placement of the hypertext links on the web page can greatly affect the efficiency of information navigation. Sometimes hypertext links to related information are placed sporadically throughout the HTML document. Such a design may cause the user to scroll through an entire document to locate a link.

One way to minimize this problem is to group the links together in one or more navigation areas. Currently, most web pages group hypertext links in constant sized navigational areas located on the HTML page. One disadvantage of this technique is that users often have widely varied space on their visual display, otherwise known as "screen real estate," in which to display content. The available screen real estate can vary from a very small screen on a small hand held Personal Digital Assistant (PDA) to a display area that has a height and width of 20×20 inches. If the navigation area consumes a greater amount of the screen, then there will be less available screen real estate to display the content on the HTML page. For this reason, constant sized navigation areas are often undesirable, especially for users with a small display screen as the navigation area may interfere or "crowd out" the display of the content.

Another common technique is to include the navigation area in a frame. Frames are a feature supported by some, but not all, HTML browsers that enables the Web author to divide the browser display area into two or more sections (frames). The contents of each frame are taken from a different URL. Frames provide great flexibility in designing Web pages, although they presently are supported unevenly by current browsers. To divide a page into frames, each frame displays a separate HTML document. If a developer wanted to divide a page into two side by side frames, then one complete HTML document would be placed in the left frame and another complete HTML document in the right frame. In addition the developer would need to write a third HTML document as a master page. This master page contains the <FRAME> tags which specify which HTML document belongs to each frame. FIG. 1 illustrates a prior art HTML page 100 employing frames for its navigation area. Page 100 consists of frames 102 and 103. Frame 102 is used for navigation about the web site. Frame 103 consists of the content for the page. Scroll bars 104 and 105 enable the user to view more content which is present on this page.

Framing is problematic because many HTML browsers do not support framing and the frame structures consume a significant amount of display real estate. For instance, the horizontal and vertical scroll bars appear in the frames when the navigational area is larger than the area allotted for the frame. Scroll bars consume display space (i.e. screen real estate) within the frame and cause the navigation to be more cumbersome to use. Framing is especially problematic for small display screens, in which the framing structures would consume a significant amount of the available screen real estate. Other disadvantages of frames include:

a. The user is tied to the way frames are implemented. The resulting navigation can only work the way the frames work—i.e. with scroll bars.
 b. The default size must be specified. Frames must have a size specified in either pixels, or as a percentage of the total area. If the navigation size is increased (i.e. a section gets renamed and the resulting text is too long), then scroll bars may suddenly appear until the default size is changed as well.

c. Frames can be maximized into their own windows. This can be disadvantageous because too many windows may be difficult to manage by the user. Moreover, a window may be hard to locate if it is hidden underneath other windows.

Accordingly, there is a need in the art for an improved technique for providing navigation areas in a page of information, especially for HTML pages.

SUMMARY OF THE PREFERRED EMBODIMENTS

To overcome the limitations in the prior art described above, preferred embodiments disclose a system, method, program, and electronic storage media for providing at least one content area of information and n different sized navigation areas. There are n addressable locations for each content area. Each of the n addressable locations for one content area comprises the same content area with a different sized navigation area. Further, each of the n navigation areas includes at least one link to another addressable location with the same content area and a different sized navigation area.

In further embodiments, there are m content areas. In such case, n times m pages are provided such that each page includes one of the m content areas and one of the n navigation areas. Alternatively, there are n times m addressable locations and at least one page including multiple addressable locations. In such case, each addressable location includes one of the m content areas and one of the n navigation areas.

In still further embodiments, the content area may comprise a content type such as text, images, audio, movies, and three dimensional images. Further, the page may be implemented in an SGML document such that the links comprise hypertext links.

Preferred embodiments provide a design of interlinking pages for displaying an area of the same content with different size navigation areas. This design is particularly useful for implementing HTML type pages, especially for users having smaller screen displays and/or using older version HTML web browsers that do not support framing. The preferred embodiments allow the user to select the size of the navigation area to display with the content. In this way, the user may select a navigation area that is suitable to the user's available screen real estate and browser capabilities.

BRIEF DESCRIPTION OF THE DRAWINGS

Referring now to the drawings in which like reference numbers represents corresponding parts throughout.

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Computing Environment

Figure 1:
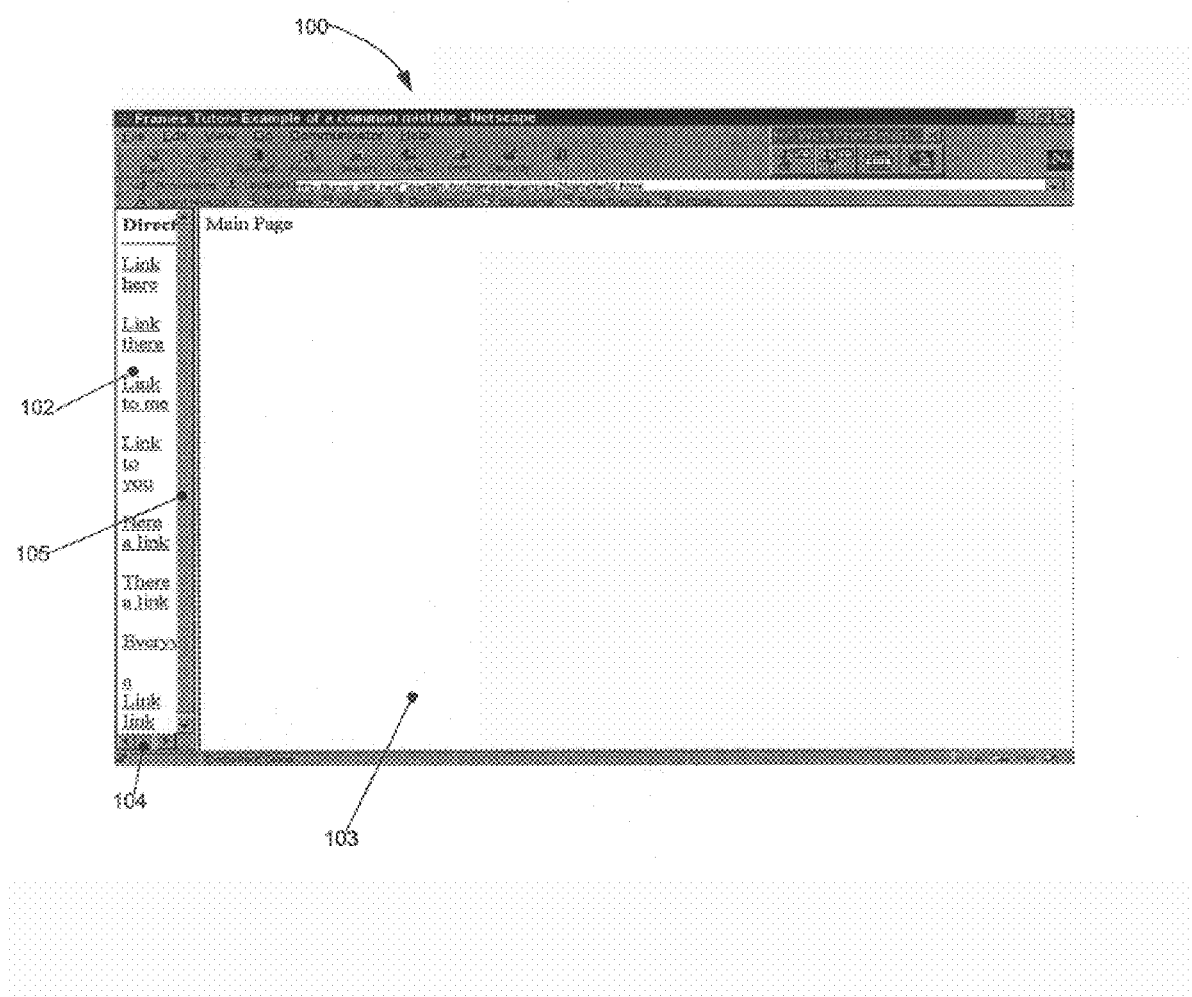
FIG. 1 illustrates a an HTML page implementing framing in a manner known in the art.
Figure 2:
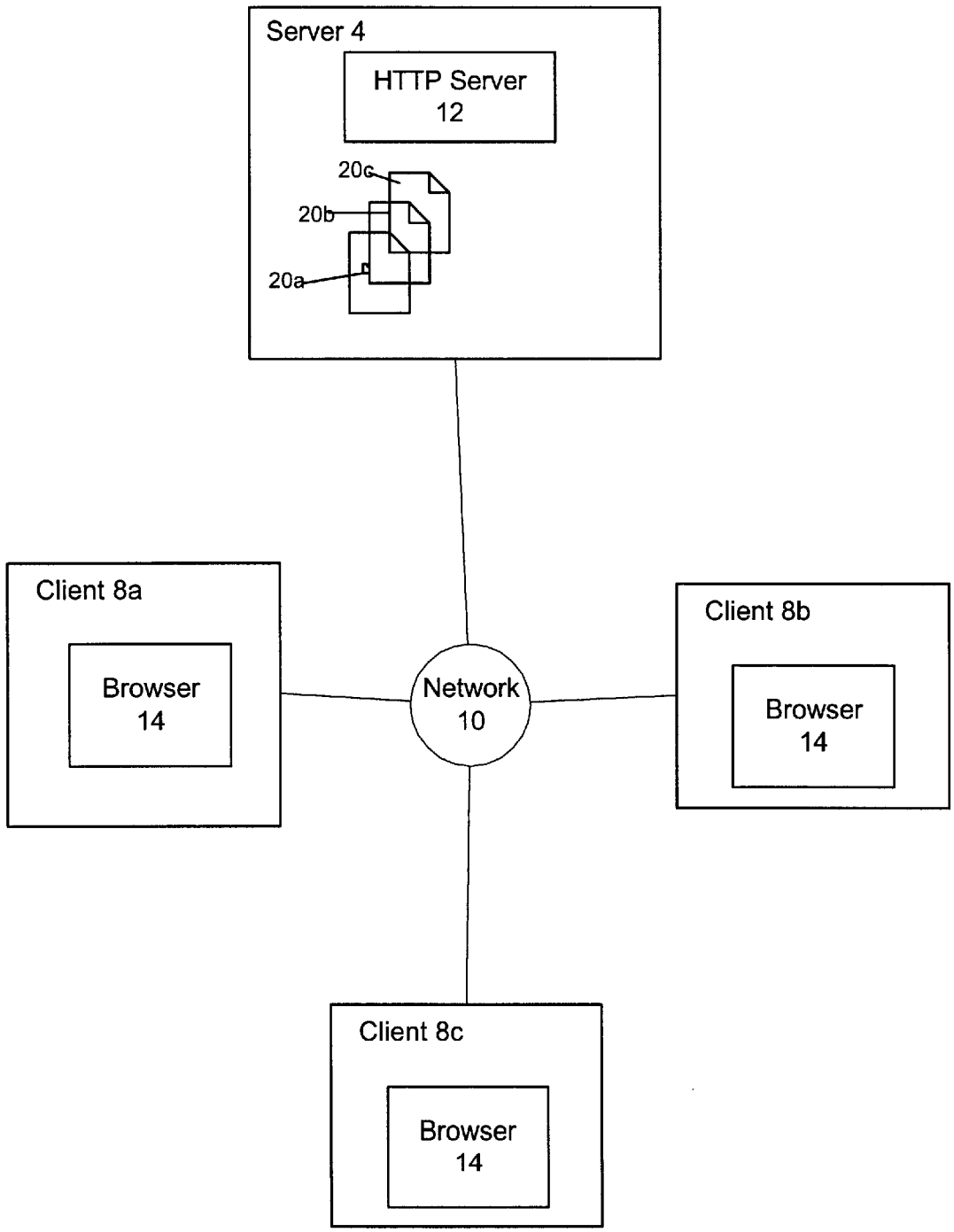
FIG. 2 illustrates a computing environment in which preferred embodiments in accordance with the present invention are implemented.

FIG. 2 illustrates a hardware and software environment in which preferred embodiments are implemented. A computing environment 2 comprises a server 4, client computers 8a, b, c, and a network 10 providing communication therebetween. The server 4 may be any server device known in the art capable of servicing network requests, e.g., IBM NETFINITY, AS/400, and RS/6000; and POWEREDGE from Dell Computer Corporation. The client 8a, b, c may be comprised of any computing device known in the art that is capable of accessing and retrieving information from a network. In preferred embodiments, the server 4 includes a Hypertext Transfer Protocol (HTTP) program 12 to service HTTP requests from the clients 8a, b, c. The server 4 may also include software to handle document requests in data transfer protocols other than HTTP, such FTP, Gopher, WAIS, NNTP, SMTP, etc. The clients 8a, b, c include one or more browser programs 14 that are capable of submitting document requests to the server 4. In preferred embodiments, the browser program 14 is a Hypertext Markup-Language (HTML) browsers, e.g., NETSCAPE Communicator, the MICROSOFT Internet Explorer, Spry Mosaic, NCSA Mosaic, Lynx, Opera, GNUscape Navigator, etc., that includes HTTP software to function as an HTTP client to transfer document requests to the server 4. The HTTP server protocol is described in "Hypertext Transfer Protocol—HTTP/1.1," Network Working Group, Request for Comments No. 2068 (January, 1997), which publication is incorporated herein by reference in its entirety. The browser program 14 may also include plug-ins or additional program features to process files in other media formats, such as sound files, movie files, JAVA™ applets**, etc.

**NETSCAPE is a registered trademark of the Netscape Communications Corporation; WINDOWS and MICROSOFT are registered trademarks of Microsoft Corporation; OS/2, NETFINITY, AS/400, and RS/6000 are registered trademarks of International Business Machines Corporation; JAVA is a trademark of Sun Microsystems, Inc; POWEREDGE is a registered trademark of the Dell Computer Corporation.

The network 10 may be a TCP/IP network, such as the Internet and World Wide Web, or any other network system known in the art, e.g., LAN, Ethernet, WAN, System Area Network (SAN), Token Ring, LocalTalk, TCP/IP, the Internet, etc. Alternatively, there may be separate and different networks between the server 4 and clients 8a, b, c.

The server 4 further includes a storage area, e.g., hard disk drive, tape drive, cache, etc., to store the HTML pages 16a, b, c, which the clients 8a, b, c request using their HTML browsers 12. The pages 16a, b, c may include any text or media known in the art, including text, images, sound files, movies, Java applets, etc. The term "pages" as used refers to any type of data structure known in the art capable of presenting information, wherein the information may be implemented in any media format known in the art, such as text, audio, video images, still images, animation, three-dimensional images, etc.

Interlinking Pages

In preferred embodiments, a document or related documents are implemented in multiple HTML pages. Thus a web site developer when designing a web site would utilize the preferred embodiment page implementation method to provide information, such as sections of a document, pages of a book, articles from a newspaper, music from different artists, etc. Each page includes a navigation area including HTML links, typically implemented with the HTML HREF code, to the other related pages. Details of HTML code for implementing HTML pages is described in the publication "Hypertext Markup Language—2.0", published as Request For Comments 1866 (1995), which document is incorporated herein by reference in its entirety. In preferred embodiments, the navigation area may be implemented in different sizes, such as a very thin rectangle, which takes up minimal screen real estate and does not display complete information on the links, to a larger area navigational area which takes up a greater amount of screen real estate and provides more complete descriptive information on the links therein. The navigation area includes hypertext links to pages having the same content, but with a different sized navigation area to allow the user to select the size of the navigation area to display on the screen with the information. The hyptertext links to other pages may be displayed as text or an image. If the same image is used to display a hypertext link in different pages, then only one copy of that image is stored as the different pages can reference that same image to display the link, even though the link represented by the image may, in fact, reference different pages.

With preferred embodiments, each HTML page would include links to other HTML pages that display different content with the same size navigation area and include links to HTML pages that display the same content with a different size navigational area. This allows the user, for a given displayed content, to determine the size of the navigation area to display with the information. Thus, if the user has a small screen display, the user can select to display the minimum sized navigation area or if a larger screen, the larger display area. The content displayed in a page may comprise any content type known in the art, including text, images, audio, movies, and three dimensional images, stored in any known format for displaying such content.

With the preferred embodiments, if there are m pages of different content, such as different pages or sections of a book, and n possible sized navigation areas, then there would need to be m times n pages, to provide each size navigation area with each content area. In this way, the web page designer, would code an HTML page to include a navigation area displaying hypertext links to other pages with different content and other pages with the same content but different sized navigation areas.

Figure 3:
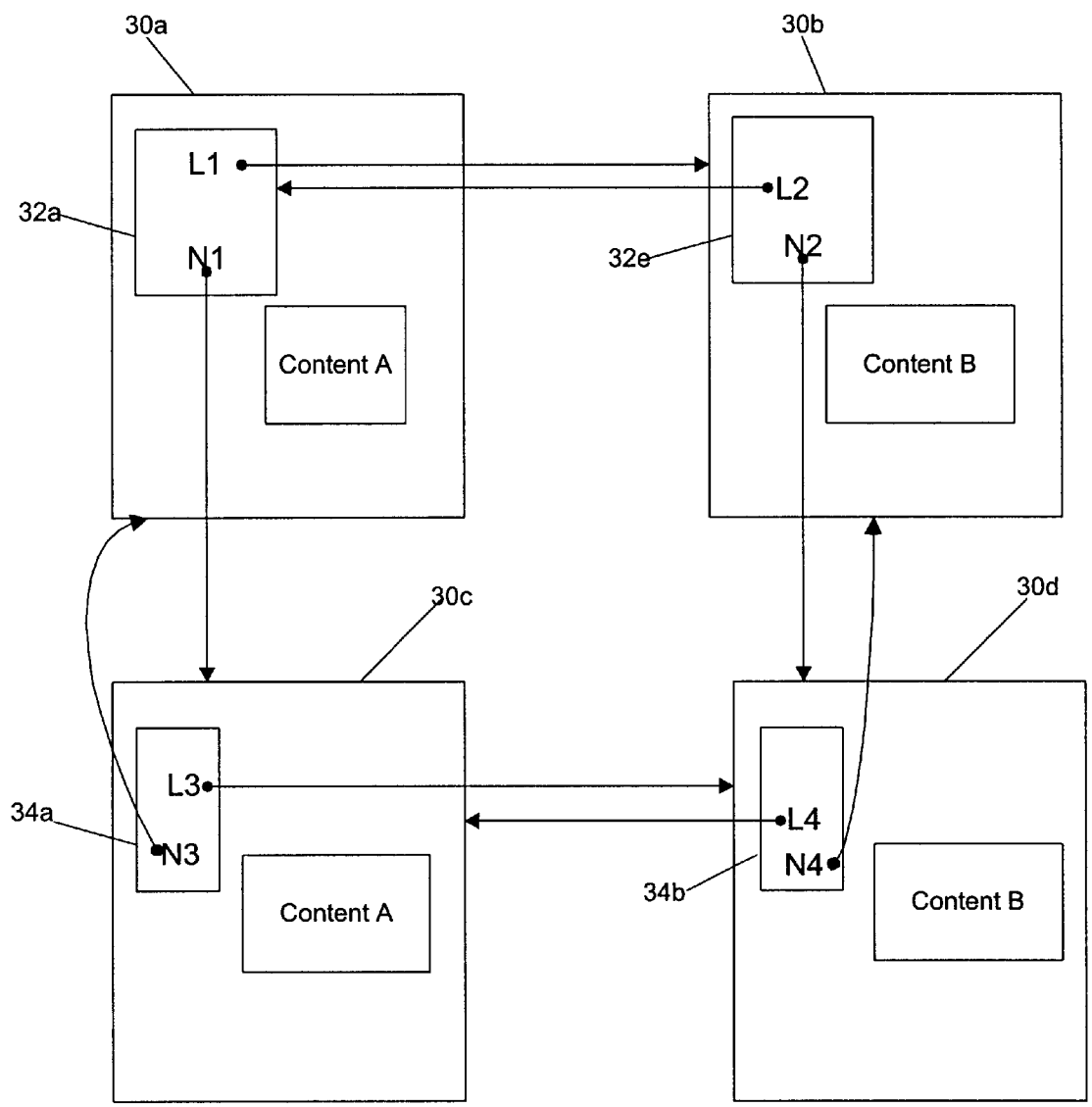
FIG. 3 illustrates an example of interlinking pages in accordance with preferred embodiments of the present invention.

FIG. 3 illustrates an example of the preferred interlinking page structure in the case that there are two possible pages of content, Content A and B, and two different size navigation areas 32 and 34, requiring a total of four different pages 30a, b, c, d. Pages 30a and 30b include navigation areas 32a and 32b that have the same size, which consumes greater screen real estate than the navigation areas 34a and 34b in pages 30c and 30d. Navigation area 32a in page 30a includes a hypertext link L1 to page 30b, which has different Content B but the same size navigation area 32b and a hyptertext link N1 to page 30c that has a smaller navigation area 34a and the same Content A. Navigation area 32b in page 30b includes a hypertext link L2 to page 30a, which has different Content A but the same size navigation area 32a and a hypertext link N2 to page 30d that has a smaller navigation area 34b and the same Content B. Navigation area 34a in page 30c includes an HTML link L3 to page 30b which has different Content B, but the same size navigation area 32b and an HTML link N3 to page 30a that has a larger navigation area 32a and the same Content A. Navigation area 34b in page 30d includes an HTML link L4 to page 30b which has different Content A, but the same size navigation area 32a and an HTML link N4 to page 30b that has a larger navigation area 32b and the same Content B.

Figure 4:
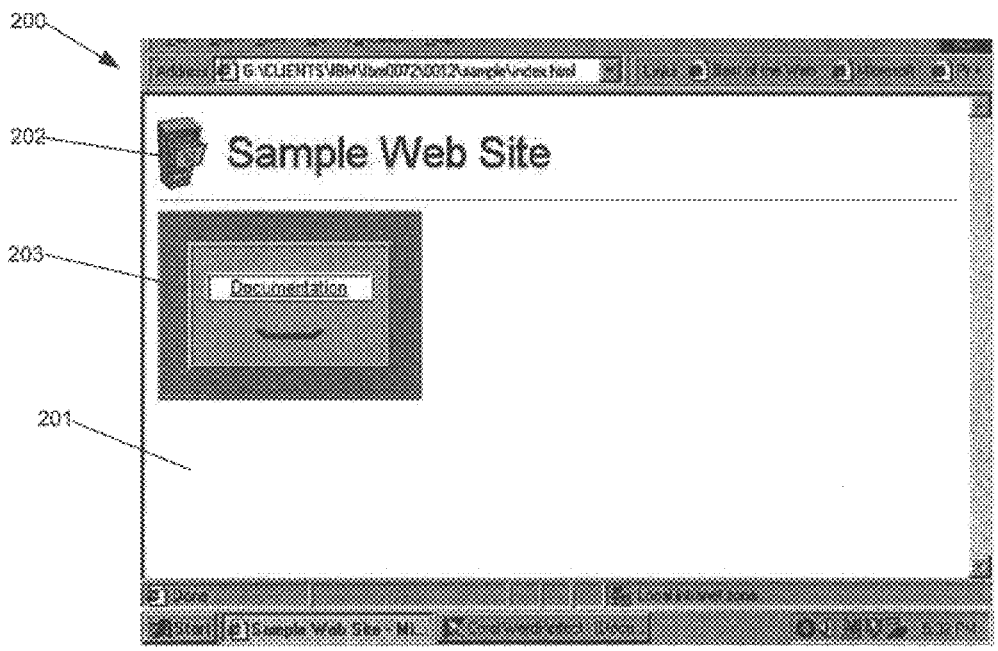
FIGS. 4–11 illustrate an example of HTML pages in accordance with preferred embodiments of the present invention.
Figure 5:
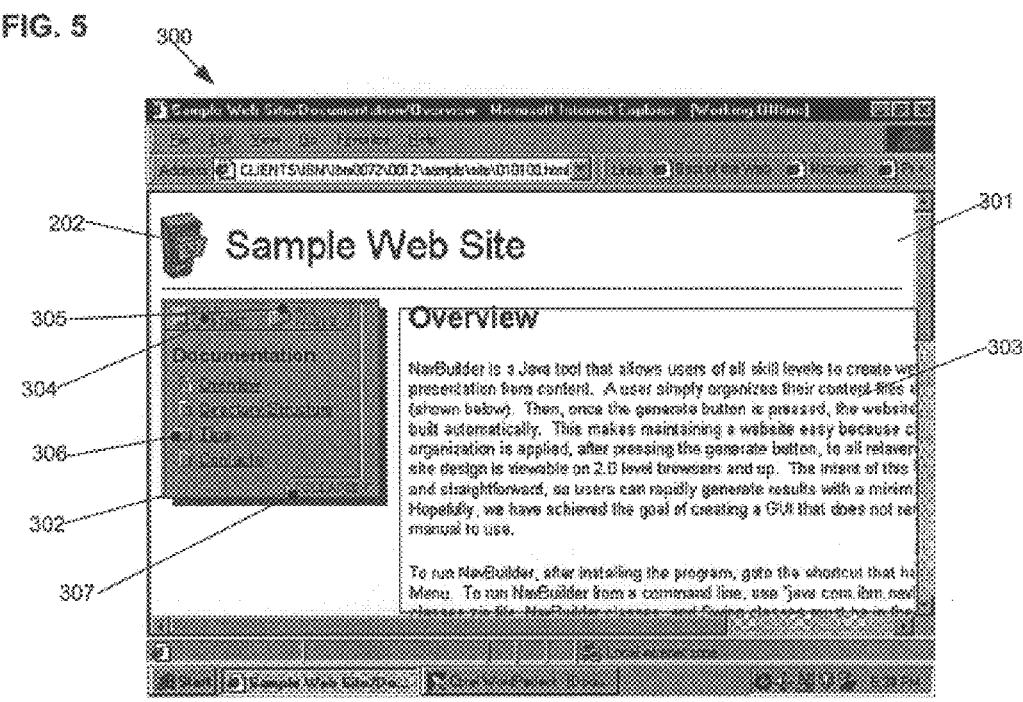
Figure 6:
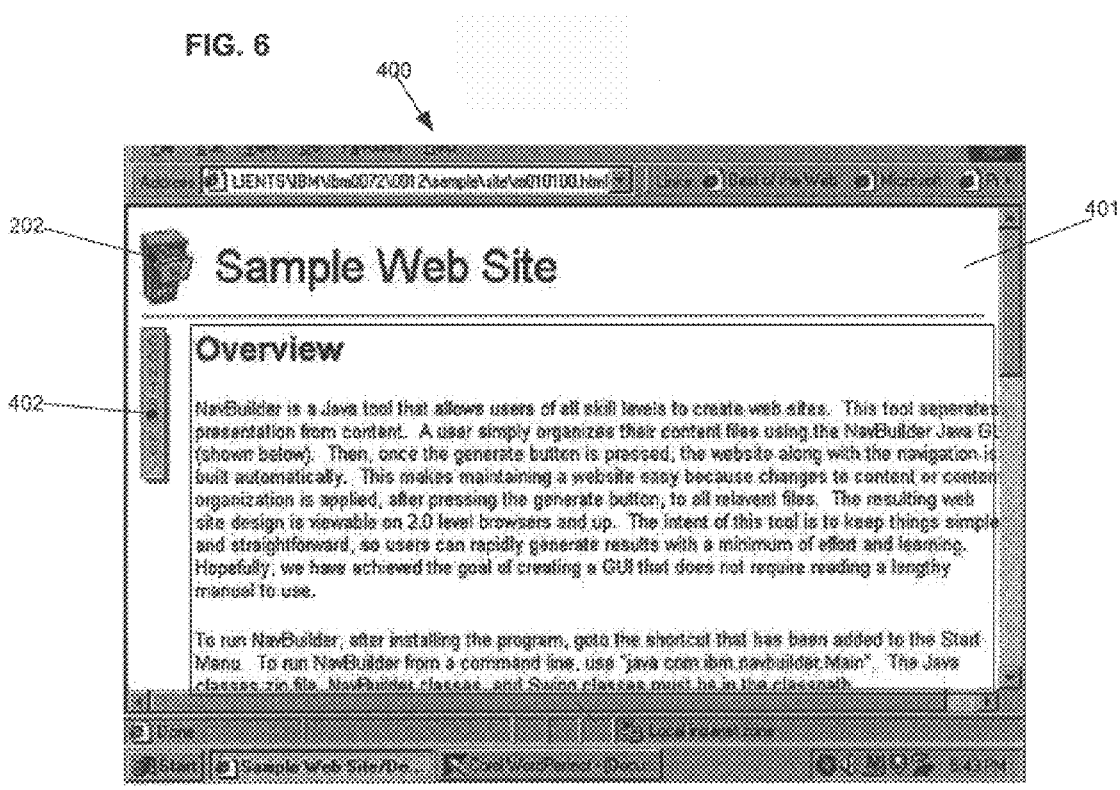

FIGS. 4–11 provide further examples of the GUI layouts of the preferred embodiment pages for allowing the user to select the size of the navigation area to display. Referring to FIG. 4, window 200 includes HTML page 201 which in turn contains file cabinet icon 202 and file drawer icon 203. When the user selects file drawer icon 203 with a computer mouse or other input device, the hypertext link associated with file drawer icon 203 retrieves HTML page 300 illustrated in FIG. 5.

Window 300 includes HTML page 301 which contains intermediate navigation area 302 and content 303. Intermediate navigation area 302, in turn, includes FILE CABINET icon 304, ALL PAGES icon 305, TIPS folder icon 306, and COLLAPSE bar 307. Should the user select FILE CABINET icon 304, then the hypertext link associated with HTML page 201 will be retrieved thus returning the user to window 200. Note that in window 300, intermediate navigation area 302 occupies a large portion of the computer screen's real estate. Thus content 303 is thereby reduced in size and quantity.

Should the user desire to view more content 303, the user can select COLLAPSE bar 307. The hypertext link associated with COLLAPSE bar 307 will retrieve HTML page 401 illustrated in FIG. 6. Window 400 includes HTML page 401 which in turn contains CONTROLS bar 402 and content 401. As is apparent from FIG. 6, intermediate navigation area 302 is no longer present. In its place is CONTROLS bar 402 which occupies significantly less screen real estate. Content 303 therefore is increased in size and quantity. When the user has completed reviewing content 303, CONTROLS bar 402 can be selected and its associated link will retrieve HTML page 300 thus returning the user to window 300.

Returning to FIG. 7, should the user select TIPS folder icon 306, the browser will retrieve HTML page 501 illustrated in FIG. 7. HTML page 501 displayed in window 500 contains expanded navigation area 502 and content 503. Expanded navigation area 502, in turn, includes not only all of the objects and links which are present in intermediate navigation area 302 but also some additional navigation links. As is apparent in FIG. 7, expanded navigation area 502 consumes even greater screen real estate thereby leaving the least amount of display space for content 503. On the other hand, however, the user is presented with additional navigation options.

Figure 7:
Figure 8:
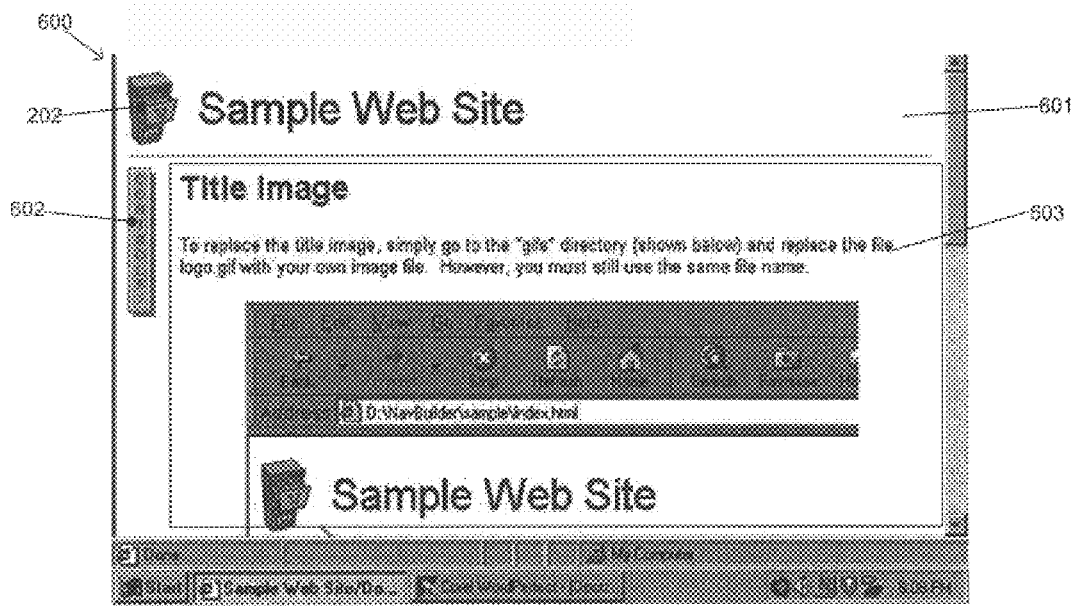
Figure 9:
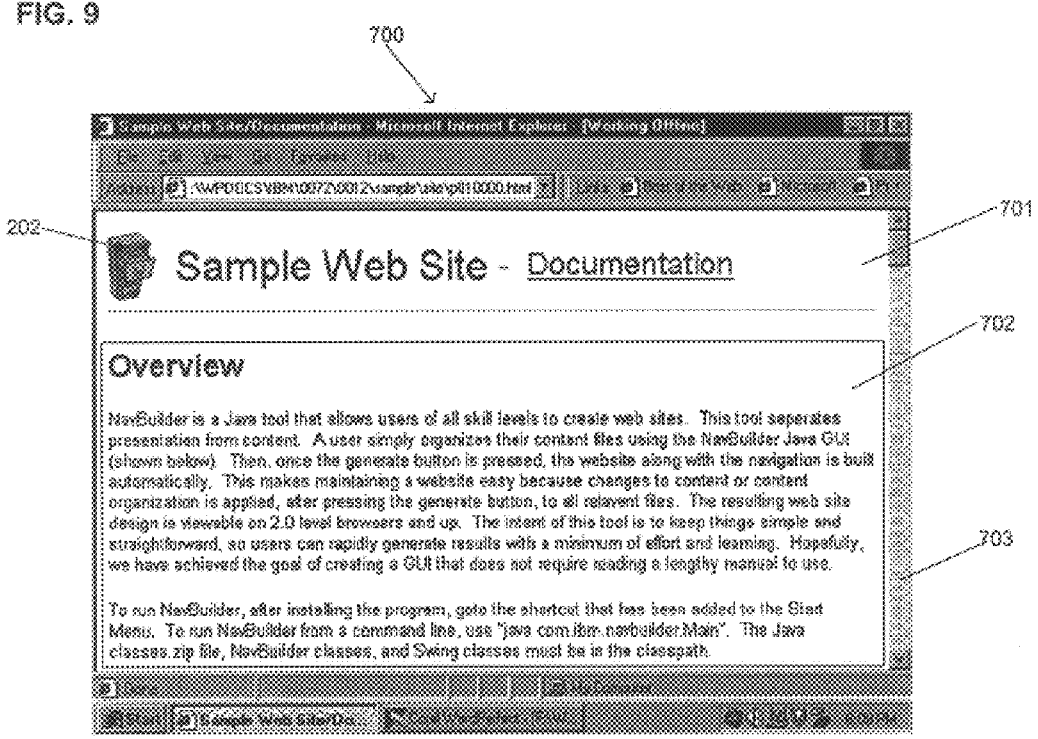

As before, the user has the option in FIG. 7 of viewing more content 503. By selecting COLLAPSE bar 307, the associated link will retrieve HTML page 601, shown in FIG. 8. HTML page 601, displayed in window 600, includes CONTROLS bar 602 and content 503. As is apparent from FIG. 8, expanded navigation area 502 is no longer present. In its place is CONTROLS bar 602 which occupies significantly less screen real estate. Content 503 therefore is increased in size and quantity. When the user has completed reviewing content 503, CONTROLS bar 602 can be selected and the associated link will retrieve HTML page 500.

One option available to the user is to remove all navigation areas in order to see the maximum amount of content. Returning to FIG. 7, ALL PAGES icon 305 can be selected. This will result in the display shown in FIG. 9 which includes window 700, scroll bar 703 and HTML page 701 which in turn contains content 702. Content 702 consists of all of the content available in all HTML pages available at the web site and which were individually selectable from expanded navigation area 502 in FIG. 5. From FIG. 7 it is apparent that there is no navigation collapse bar or navigation area present to occupy real estate otherwise available for content. By using scroll bar 703, the user is able to review all content which is available at this web site. When the user desires to return to other navigation areas, file cabinet icon 202 is selected. The associated link will retrieve HTML page 801, FIG. 10.

Figure 10:
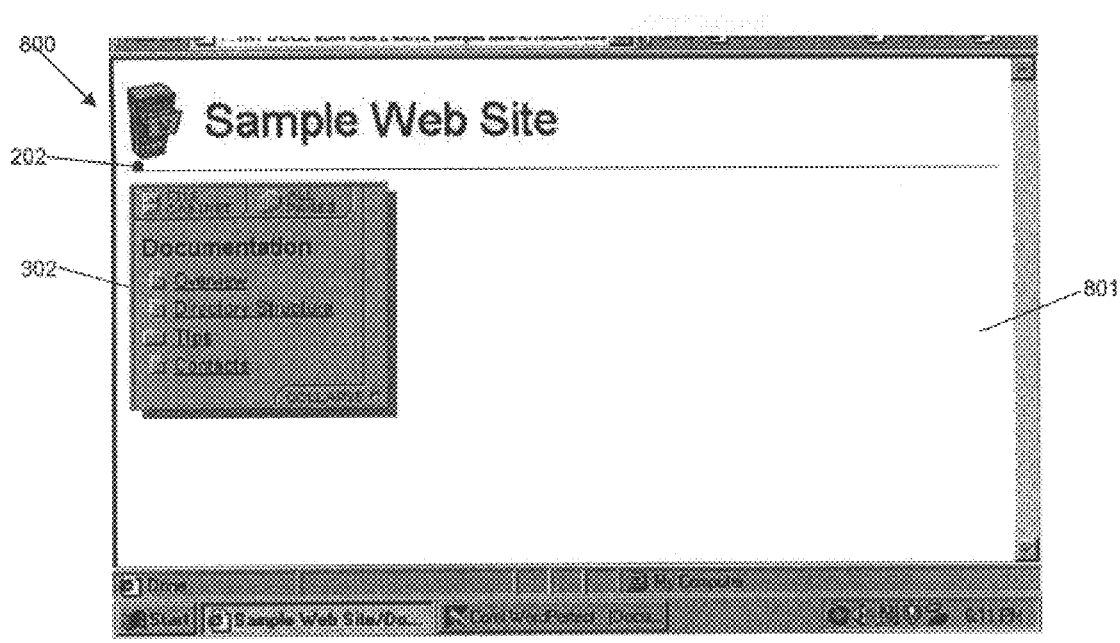

FIG. 10 depicts window 800 and HTML page 801. HTML page 801 includes intermediate navigation area 302, but has no content. From this point, the user can select any of the icons on intermediate navigation area 302 to navigate to the HTML page of interest.

Figure 11:
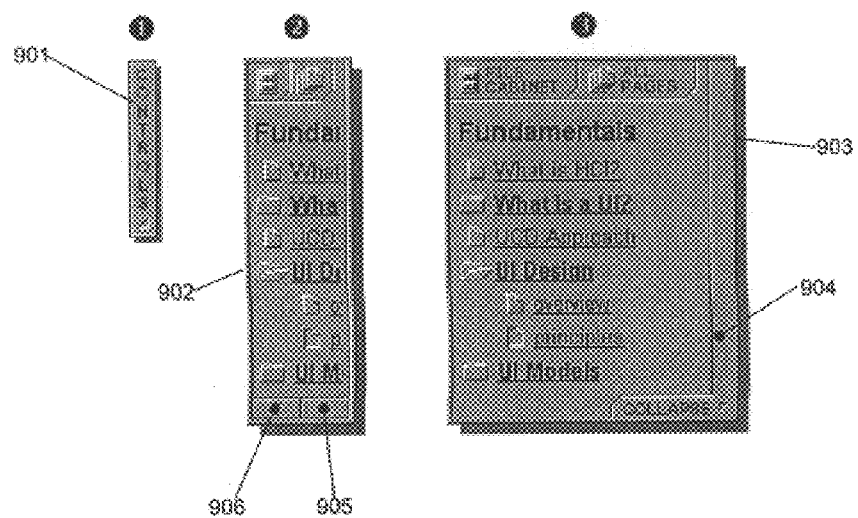

FIG. 11 illustrates different sized navigation areas. In this embodiment, the user is provided with a small 901, intermediate 902, and large 903 navigation areas to display with any given content. Maximum navigation area 903 provides the most visibility of the navigation options. Selecting COLLAPSE bar 904 will cause the associated link to retrieve a new HTML page containing intermediate navigation area 902. Selecting maximize icon 905 will return the user to the HTML page containing maximum navigation area 903. Selecting minimize icon 906 will retrieve a new HTML page containing CONTROLS bar 901. This provides the user with the greatest amount of real estate to facilitate the viewing of content. Finally, when the user selects CONTROLS bar 901, the HTML page containing intermediate navigation area 902 will be displayed.

Alternative Embodiments and Conclusions

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize that many modifications may be made to this configuration without departing from the scope of the present invention.

Preferred embodiments were described with respect to the HTTP protocol for transmitting documents between computers within a network. However, those skilled in the art will appreciate that the preferred embodiments may apply to any communication protocol for allowing a client to request and access files in a network environment.

Preferred embodiments were described with respect to a separate page for each content area. However, in alternative embodiments, multiple content areas may be on a single page. For instance, there may be m content areas on p HTML pages, where m>p. Further, any multiple number of content area/navigation area pairs may be distributed in any desired manner on different pages. In such case, a hypertext link from one page to another would include an offset into the linked page to the addressable location of the selected content area/navigation area pair. In such case, there is a separate addressable location for each content area/navigation area pair. Each addressable location for a content area displays the content area with a different sized navigation area.

Preferred embodiments were described with respect to presenting information in pages conforming to the HTML file format. However, alternative file formats for building web-like pages may be used, such as Dynamic Hypertext Mark-Up Language (DHTML), the Extensible Markup Language (XML), Cascading Sytle Sheets, any other Standard Generalized Markup Language (SGML), or any other language known in the art for creating interchangeable, structured documents. Further, any version of HTML may be used, including version 2.0, 3.2, 4.0, etc. In yet further embodiments, the requested file may be in any other file format, i.e., other than an SGML type format, capable of being displayed or otherwise executed by the requesting client.

In preferred embodiments, the image representing the navigation area is a fixed size, i.e.,"hard coded." inside the HTML document. Thus, the user must select another page to display a different sized navigation area. In alternative embodiments, different program mechanisms may be used to implement the navigation area, such as a JAVA™ applet. In such case, the user may be able to resize the navigation window as it is displayed on the screen using an input device, such as a mouse or keyboard.

Preferred embodiments were described with respect to a network environment in which pages are provided to a client from a server over a network, such as the Internet. However, in alternative embodiments the interlinking pages may be maintained within and used by a single computing device, such as a computer with a hard disk drive.

In summary, the present invention provides a system, method, program, and electronic storage media for providing at least one content area of information and n different sized navigation areas. There are n addressable locations for each content area. Each of the n addressable locations for one content area comprises the same content area with a different sized navigation area. Further, each of the n navigation areas includes at least one link to another addressable location with the same content area and a different sized navigation area.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for presenting information on a display monitor under control of a computer, comprising:

providing at least one content area of information and n different sized navigation areas, wherein n comprises a number of the different sized navigation areas; and providing n page locations for each content area, wherein the n page locations for one content area have the content area with a different sized navigation area, wherein each navigation area at the page locations for the content area includes at least one link to another page location with the content area mid a different sized navigation area, wherein each page location enables access to one content area and navigation area to be displayed, wherein the content area and navigation area are displayed in separate regions at the page location, and wherein the links comprise hypertext links.

2. The method of claim 1, wherein providing each content area comprises providing m content areas, wherein each page location comprises a separate page, and further comprising providing n times m pages, wherein each page includes one of the m content areas and one of the n navigation areas.

3. The method of claim 1, wherein providing the content area comprises providing m content areas, and further comprising providing n times m page locations and at least one page including multiple page locations, wherein each page location includes one of the m content areas and one of the n navigation areas.

4. A method for presenting information on a display monitor under control of a computer, comprising:

receiving a first request for a first page location comprising a content area and a first of n different sized navigation areas, wherein each page location enables access to one content area and navigation area to be displayed, wherein the content area and navigation area are displayed in separate regions at the page location, and wherein n comprises a number of the different sized navigation areas;

transmitting the content area and first navigation area at the requested first page location;

receiving a second request for a second page location comprising the same content area at the first addressable location and a second of n navigation areas having a different size than the first navigation area at the first addressable location; and transmitting the content area and second navigation area at the second page location in response to the second request wherein the links comprise hypertext links.

5. The method of claim 4, further comprising:

receiving a third request for a third page location for a content area that is different from the content area at the first page location and the first navigation area at the first page location; and transmitting the content area and first navigation area at the third page location in response to the second request.

6. The method of claim 5, wherein at least two pages having distinct network addresses include the three page locations, wherein the request for one of the page locations comprises a request for the page and content area and navigation area therein at the distinctive network address.

7. The method of claim 1, further comprising:

providing m content areas, wherein there are m times n page locations for each content area and navigation area pair; and displaying the content area and navigation area at one of the page locations, wherein the displayed navigation areas display links to m−1 page locations including different content areas and the same sized navigation area and links to n−1 page locations including the same content area as at the displayed page location and one of the n−1 navigation areas that has a different size than the navigation area at the displayed page location.

8. The method of claim 1, wherein the content area includes content that is one of the content types comprising text, images, audio, movies, and three dimensional images.

9. The method of claim 2, wherein each page is implemented in an SGML document and wherein the links comprise hypertext links.

10. The method of claim 1, wherein the displayed size of the navigation area is capable of being modified with a user input device.

11. A system for presenting information displayed in a page including a navigation area and a content area, comprising:

a computer; and a storage area accessible to the computer including at least one content area of information and n different sized navigation areas, wherein n comprises a number of the different sized navigation areas, wherein there are n page locations for each content area, wherein the n page locations for one content area have the content area with a different sized navigation area, and wherein each navigation area at the page locations for the content area, includes at least one link to another page location with the content area and a different sized navigation area, wherein each page location enables access to one content area and navigation area to be displayed, wherein the content area and navigation area are displayed in separate regions at the page location, and wherein the links comprise hypertext links.

12. The system of claim 11, wherein each page location comprises a page, wherein the storage area includes m content areas and n times m pages, wherein each page includes one of the m content areas and one of the n navigation areas.

13. The system of claim 11, wherein the storage area includes m content areas, n times m page locations, wherein at least one page includes multiple page locations, and wherein each page location includes one of the m content areas and one of the n navigation areas.

14. A system for presenting information displayed in a page including a navigation area and a content area, comprising:

a computer;

a network communication for communicating with a remote device;

program logic executed by the computer, including:

(i) means for receiving a first request from the remote device for a first page location comprising a content area and a first of n different sized navigation areas, wherein each page location enables access to one content area and navigation area to be displayed, wherein the content area and navigation area are displayed in separate regions at the page location, and wherein n comprises a number of the different sized navigation areas;

(ii) means for transmitting to the remote device the content area and first navigation area at the requested first page location;

(iii) means for receiving from the remote device a second request for a second page location comprising the same content area at the first page location and a second of n navigation areas having a different size than the first navigation area at the first page location; and (iv) means for transmitting to the remote device the content area and second navigation area at the second page location in response to the second request wherein the links comprise hypertext links.

15. The system of claim 14, wherein the program logic further comprises:

means for receiving a third request from the remote device for a third page location for a content area that is different from the content area at the first page location and the first navigation area at the first page location; and means for transmitting the content area and first navigation area at the third page location in response to the second request.

16. The system of claim 15, wherein at last two pages having distinct network addresses include the three page locations, wherein the request for one of the page locations comprises a request for the page and content area and navigation area therein at the distinctive network address.

17. The system of claim 11, wherein the storage area includes m content areas, wherein there are m times n page locations for each content area and navigation area pair, and wherein the program logic further comprises means for displaying the content area and navigation area at one of the page locations, wherein the displayed navigation areas displaying links to m−1 page locations including different content areas and the same sized navigation area and links to n−1 page locations including the same content area as at the displayed page location and one of the n−1 navigation areas that has a different size than the navigation area at the displayed page location.

18. The system of claim 11, wherein the content area includes content that is one of the content types comprising text, images, audio, movies, and three dimensional images.

19. The system of claim 12, wherein each page is implemented in an SGML document and wherein the links comprise hypertext links.

20. The system of claim 11, wherein the displayed size of the navigation area is capable of being modified with a user input device.

21. An article of manufacture for use in programming a computer to present information, the article of manufacture comprising a computer usable medium including at least one computer program that causes the computer to perform:
    providing at least one content area of information and n different sized navigation areas wherein n comprises a number of the different sized navigation areas; and
    providing n page locations for each content areas wherein the n page locations for one content area have the content area with a different sized navigation area, and wherein each navigation area at the page locations for the content area includes at least one link to another page location with the content area and a different sized navigation area, wherein each page location enables access to one content area and navigation area to be displayed, and wherein the content area and navigation area are displayed in separate regions at the page location wherein the links comprise hypertext links.

22. The article of manufacture of claim 21, wherein providing each content area comprises providing m content areas, wherein each page location comprises a page, and further comprising providing n times m pages, wherein each page includes one of the m content areas and one of the n navigation areas.

23. The article of manufacture of claim 21, wherein providing the content area comprises providing m content areas, and further comprising providing n times m page locations and at least one page including multiple page locations, wherein each page location includes one of the m content areas and one of the n navigation areas.

24. An article of manufacture for use in programming a computer to present information, the article of manufacture comprising a computer usable medium including at least one computer program that causes the computer to perform:
    receiving a first request for a first page location comprising a content area and a first of n different sized navigation areas, wherein each page location enables access to one content area and navigation area to be displayed, wherein n comprises a number of the different sized navigation areas, and wherein the content area and navigation area are displayed in separate regions at the page location;
    transmitting the content area and first navigation area at the requested first page location;
    receiving a second request for a second page location comprising the same content area at the first page location and a second of n navigation areas having a different size than the first navigation area at the first page location; and
    transmitting the content area and second navigation area at the page addressable location in response to the second request wherein the links comprise hypertext links.

25. The article of manufacture of claim 24, further causing the computer to perform:
    receiving a third request for a third page location for a content area that is different from the content area at the first page location and the first navigation area at the first page location; and
    transmitting the content area and first navigation area at the third page location in response to the second request.

26. The article of manufacture of claim 25, wherein at least two pages having distinct network addresses include the three page locations, wherein the request for one of the page locations comprises a request for the page and content area and navigation area therein at the distinctive network address.

27. The article of manufacture of claim 21, further causing the computer to perform:
    providing m content areas, wherein there are m times n page locations for each content area and navigation area pair; and
    displaying the content area and navigation area at one of the page locations, wherein the displayed navigation areas display links to m−1 page locations including different content areas and the same sized navigation area and links to n−1 page locations including the same content area as at the displayed page location and one of the n−1 navigation areas that has a different size than the navigation area at the displayed page location.

28. The article of manufacture of claim 21, wherein the content area includes content that is one of the content types comprising text, images, audio, movies, and three dimensional images.

29. The article of manufacture of claim 22, wherein each page is implemented in an SGML document and wherein the links comprise hypertext links.

30. The article of manufacture of claim 21, wherein the displayed size of the navigation area is capable of being modified with a user input device.

31. A computer readable storage medium including:
    at least one content area of information and n different sized navigation areas, wherein n comprises a number of the different sized navigation areas; and
    n page locations for each content area, wherein the n page locations for one content area have the content area with a different sized navigation area, wherein each navigation area at the page locations for the content area includes at least one link to another page location with the content area and a different sized navigation area, wherein each page location enables access to one content area and navigation area to be displayed, wherein the content area and navigation area are displayed in separate regions at the page location, and wherein the links comprise hypertext links.

32. The computer readable storage medium of claim 31, further including m content areas and n times m pages, wherein each page location comprises a page, and wherein each page includes one of the m content areas and one of the n navigation areas.

33. The computer readable storage medium of claim 31, further including m content areas and n times m page locations and at least one page including multiple page locations, wherein each page location includes one of the m content areas and one of the n navigation areas.

34. The computer readable storage medium of claim 31, wherein the content area includes content that is one of the content types comprising text, images, audio, movies, and three dimensional images.

35. The computer readable storage medium of claim 31, wherein each page is implemented in an SGML document and wherein the links comprise hypertext links.

36. The computer readable storage medium of claim 31, wherein the size of the navigation area is capable of being altered with a user input device.

* * * * *

UNITED STATES PATENT AND TRADEMARK OFFICE
CERTIFICATE OF CORRECTION

PATENT NO.    : 6,549,220 B1
DATED         : April 15, 2003
INVENTOR(S)   : Jimmy Ming-Der Hsu, Peter Y. Hsu and William W. Lawton It is certified that error appears in the above-identified patent and that said Letters Patent is hereby corrected as shown below:

<u>Drawings,</u>
Figure 3, "32e" should be -- 32b --.

<u>Column 5,</u>
Line 62, "30b" should be -- 30d --.
Line 66, "30b" should be -- 30c --.

Signed and Sealed this

Eighteenth Day of November, 2003

JAMES E. ROGAN
*Director of the United States Patent and Trademark Office*